United States Patent [19]

Sato et al.

[11] Patent Number: 4,713,115

[45] Date of Patent: Dec. 15, 1987

[54] METHOD FOR DEMOLISHING DURABLE STRUCTURES

[75] Inventors: Masao Sato, Yachiyo; Masaaki Ichimura, Tokyo; Kunio Sato, Ichikawa, all of Japan

[73] Assignee: Sumitomo Cement Co., Ltd., Tokyo, Japan

[21] Appl. No.: 737,010

[22] Filed: May 23, 1985

Related U.S. Application Data

[63] Continuation-in-part of Ser. No. 614,709, May 29, 1984, abandoned, which is a continuation of Ser. No. 354,648, Mar. 4, 1982, abandoned, which is a continuation-in-part of Ser. No. 208,844, Nov. 20, 1980, abandoned.

[30] Foreign Application Priority Data

Dec. 1, 1979 [JP] Japan .................. 54-154979

[51] Int. Cl.⁴ .............................................. C04B 7/06
[52] U.S. Cl. ............................ 106/118; 106/90; 106/109; 106/110; 106/111; 106/119; 423/594; 423/635
[58] Field of Search ............. 106/89, 90, 119, 109, 106/110, 111, 118; 423/175, 178, 636, 637, 635, 594

[56] References Cited

U.S. PATENT DOCUMENTS

| | | | |
|---|---|---|---|
| 3,188,221 | 6/1965 | Matsuda et al. | 106/89 |
| 3,857,714 | 12/1974 | Metha | 106/89 |
| 3,861,929 | 1/1975 | Deets et al. | 106/89 |
| 3,947,288 | 3/1976 | Kawano et al. | 106/89 |
| 4,002,483 | 1/1977 | Daugherty et al. | 106/89 |
| 4,220,475 | 9/1980 | Tokar et al. | 106/118 |
| 4,354,877 | 10/1982 | Kawano et al. | 106/90 |
| 4,378,997 | 4/1983 | Kasama et al. | 106/98 |
| 4,409,030 | 10/1983 | Minegishi et al. | 106/118 |
| 4,452,637 | 6/1984 | Suzukawa et al. | 106/89 |
| 4,477,284 | 10/1984 | Isogai et al. | 106/90 |
| 4,508,574 | 4/1985 | Kurandt et al. | 106/109 |

FOREIGN PATENT DOCUMENTS 0028513 10/1980 European Pat. Off. ............. 106/89

*Primary Examiner*—Andrew H. Metz
*Assistant Examiner*—Anthony W. Garlan
*Attorney, Agent, or Firm*—Armstrong, Nikaido, Marmelstein & Kubovcik

[57] ABSTRACT

A durable hard structure is demolished by a method in which one or more holes are formed in a durable hard structure, filling the holes with an aqueous slurry containing a demolition-facilitating clinker composition consisting essentially of (1) 55% by weight or more of a clinker consisting essentially of 2 to 40% by weight of a calcium-alumino-ferrite solid solution, 60 to 98% by weight of both free lime and free magnesia in the ratio in weight of from 60:40 to 98.3:1.7 and not more than 6% by weight of an inevitable impurity free from $(CaO)_3Al_2O_3$ determined in accordance with Japanese Industrial Standard (JIS) R 5202, said clinker being produced at a sintering temperature of from 1200° to 1800° C., and (2) the balance consisting of a reaction moderator consisting of at least one member selected from the group consisting of (a) at least one gypsum compound in an amount of 40% or less in terms of gypsum anhydride, (b) at least one polyhydroxyl substance in an amount of 5% or less, and (c) at least one member selected from borates and mixtures of at least one borate with at least one member selected from the group consisting of organic acids and organic acid salts, in an amount of 20% or less, each amount being based on the total weight of said demolition-facilitating clinker composition; and the clinker composition in the aqueous slurry is left to generate an expansion force due to a hydration reaction thereof and to demolish the durable structure.

12 Claims, No Drawings

METHOD FOR DEMOLISHING DURABLE STRUCTURES

CROSS-REFERENCES TO RELATED APPLICATIONS

This is a continuation-in-part application from U.S. patent application Ser. No. 614,709, filed on May 29, 1984, now abandoned, which is a continuation from U.S. patent application Ser. No. 354,648 filed on Mar. 4, 1982, now abandoned, which is a continuation-in-part application from U.S. patent application Ser. No. 208,844, filed on Nov. 20, 1980, now abandoned.

FIELD OF THE INVENTION

The present invention relates to a method for demolishing durable structures. More particularly, it relates to a method for demolishing concrete, rocks, and other durable structures, by means of a specific demolition-facilitating clinker or composition containing the clinker.

BACKGROUND OF THE INVENTION

Up to now, as a method for demolishing durable hard structures such as concrete structures and rocks, the following methods have been commonly used; for example, a mechanical method utilizing an impact force by means of heavy weight, or a method utilizing an explosive force, such as dynamite. However, those methods of demolishing durable structures contain many practical restrictions in their use, considering safety noise, dust and so on. For example, the above-mentioned conventional demolishing methods are difficult to carry out in a residential area or the like.

Considering the above-mentioned circumstances, the inventors of the present invention carried out a wide range of systematic research in an attempt to discover a method for demolishing durable hard structures by using a specific demolition-facilitating substance.

DETAILED DESCRIPTION OF THE INVENTION

An object of the present INVENTION is to provide a method for demolishing durable structures by means of a specific clinker or clinker compositions, which clinker is suitable for safely and easily demolishing, at a low cost, concrete, rocks and other such durable structures.

Another object of the present invention is to provide a method for demolishing durable structures by means of a specific clinker or clinker composition without causing pollution of the environment.

As a result of the inventor's systematic research, it was found that a $CaO-Al_2O_3-Fe_2O_3-MgO$ type clinker, having a specific composition, exhibited a large expansion caused by a hydration reaction thereof, and that the demolition stress from this large expansion could be utilized for easily demolishing durable substances, such as concrete and rocks.

According to the present invention, there is provided a method for demolishing durable hard structures comprising forming one or more holes in a durable hard structure; filling up the holes with an aqueous slurry containing a demolition-facilitating clinker composition consisting essentially of (1) 55% by weight or more of a clinker consisting essentially of 2 to 40% by weight of a calcium-alumino-ferrite solid solution, 60 to 98% by weight of both free lime and free magnesia in the ratio in weight of from 60:40 to 98.3:1.7 and not more than 6% by weight of an inevitable impurity free from $(CaO)_3Al_2O_3$ determined in accordance with Japanese Industrial Standard (JIS) R 5202, the clinker being produced at a sintering temperature of from 1200° C. to 1800° C., and (2) the balance consisting of a reaction moderator consisting of at least one member selected from the group consisting of (a) at least one gypsum compound selected from the group consisting of gypsum dihydrate, gypsum hemihydrate, and gypsum anhydrate, this gypsum compound, in terms of gypsum anhydride, being present in the composition in an amount of 40% or less, (b) at least one polyhydroxyl substance selected from the group consisting of sugars and polyhydric aliphatic alcohols, the polyhydroxyl substance being present in the composition in an amount of 5% or less, and (c) at least one member selected from borates and mixtures of at least one borate with at least one member selected from the group consisting of organic acids and organic acid salts, the borate or mixture thereof with an organic acid or organic acid salt being present in the composition in an amount of 20% or less, each amount being based on the total weight of the demolition-facilitating clinker composition; and leaving the clinker composition in the aqueous slurry to demolish the durable structure by the expansion force generated from a hydration reaction of the clinker composition.

The terms "calcium-alumino-ferrite solid solution" and "$(CaO)_3Al_2O_3$" will be referred to hereinafter as "$C_4AF$" and "$C_3A$".

The above-mentioned clinker can be prepared by sintering a mixture of raw materials comprising a calcareous material, such as limestone, and/or a dolomitic material, such as dolomite, as well as a ferrite material, such as hammerscale, or a mixture of a ferrite material and an aluminous material, such as bauxite, at a temperature of from 1200° C. to 1800° C. The raw materials should be selected so as to result in the specific clinker having the above-specified composition.

The reason for limiting the amount of $C_4AF$ to the range of from 2 to 40% by weight is as follows.

When the amount of $C_4AF$ is less than 2% by weight, growth of the lime crystals is limited, and thus the handling time and demolishing force are insufficient.

When the amount of $C_4AF$ is more than 40% by weight, the amount of free lime and free magnesia inevitably become less than 60% by weight, and thus the demolition stress produced by the volume expansion arising from hydration reaction of free lime and free magnesia is insufficient.

The reason for limiting the total amount of both the free lime and free magnesia to the range of from 60 to 98% by weight is as follows. When the total amount of free lime and free magnesia is less than 60% by weight, a practicable and effective demolishing force cannot be obtained. When the total amount of free lime and free magnesia is more than 98% by weight, the amount of $C_4AF$ inevitably becomes less than 2 percent, and thus the growth of the lime and magnesia crystals is limited. Moreover, the handling time and demolishing force, after insertion of the substance for facilitating demolition processes, are insufficient because of the very rapid occurrence of hydration.

The ratio in weight of free lime to free magnesia in the clinker is in the range of from 60:40 to 98.3:1.7. That is, the content of the free magnesia in the clinker should be more than 1% by weight.

The demolition-facilitating clinker usable for the present invention is produced at a sintering temperature of from 1200° C. to 1800° C. The sintering temperature is variable within the above-mentioned range, depending on the ratio in weight of the free lime to the free magnesia.

When the sintering temperature for producing the clinker is relatively low, for example, about 1200° C. to 1300° C., the expansion of MgO in the resultant clinker, caused by the hydration reaction thereof, can be carried out at a proper stage so that a practicable and satisfactory demolishing force is achieved. Therefore, the component consisting of free lime and free magnesia may be dolomite alone, in which the ratio in weight of the free lime to the free magnesia is about 60:40. However, if the clinker is produced at a high sintering temperature of 1300° C. or more, the expansion of MgO in the resultant clinker occurs too slowly. Therefore, it is sometimes difficult to create a practicable and satisfactory demolishing force. Accordingly, in this case, the component, consisting of the free lime and the free magnesia, may be limestone alone, in which the ratio in weight of the free lime to the free magnesia is about 98.7:1.7.

It is essential that, in the clinker usable for the method of the present invention, the amount of inevitable impurity is 6% by weight or less, preferably, 3% by weight or less. The amount of the inevitable impurity is determined in accordance with Japanese Industrial Standard (JIS) R 5202. The inevitable impurity is derived from impurity substances in the raw material and contains (CaO)$_3$SiO$_2$ and (CaO)$_2$SiO$_2$, which will be referred to, hereinafter, as C$_3$S and C$_2$S, respectively, and which are undesirable hydraulic substances effectively decreasing the demolition effect of the clinker. It is preferable that the entire amount of the hydraulic substances in the inevitable impurity be not more than 6% based on the weight of the clinker. Also, it is essential that the inevitable impurity is free from C$_3$A, which is a hydraulic substance highly effective in decreasing the demolition effect of the clinker.

The method of the present invention is carried out in the following manner.

First, a durable structure such as a concrete structure or rock to be demolished are provided with one or more holes which may be made by using a drill or similar tool, and then, (a) filling up the holes with the demolition-facilitating clinker composition in the form of a fine powder, and, thereafter, adding water to this clinker composition, or (b) preliminarily mixing the demolition-facilitating clinker composition with water and then inserting the mixture into the holes, or (c) placing the above-mentioned mixture into a tube made of plastic material and then inserting the tube into the holes. Any one of the above-mentioned demolishing methods may be used, taking into consideration the kind and size of the structure or material to be demolished as well as the location of the structure or material into which the demolition-facilitating clinker or clinker composition is to be inserted.

The clinker composition usable for the process of the present invention consists essentially of (1) 55% by weight or more of the specific clinker of the present invention, and (2) the balance consisting of a reaction moderator, the amount of which is not more than 45% by weight.

The reaction moderator is effective for controlling the hydration reaction rate of the clinker composition to a moderate level.

The reaction moderator consists of at least one member selected from the group consisting of (A) 40% or less, preferably, from 5% to 40%, in terms of gypsum anhydride of at least one gypsum compound selected from the group consisting of gypsum dihydrate, gypsum hemihydrate and gypsum anhydrate, (B) 5% or less, preferably, from 0.1% to 5%, of at least one polyhydroxyl substance selected from the group consisting of sugars and polyhydric aliphatic alcohols, and (C) 20% or less, preferably, from 0.1% to 20%, of at least one member selected from borates and mixtures of at least one borate with at least one member selected from the group consisting of organic acid and organic acid salts, each amount being based on the total weight of the demolition-facilitating clinker composition.

The reaction moderator may be composed of either a single compound or substance selected from the gypsum compounds, the polyol substances, and the borates or borate mixtures as described above, or a combination of two or more of the above-mentioned members.

Some examples of the reaction moderator will be described below.

The term "gypsum compound" used herein includes gypsum dihydrate, gypsum hemihydrate, and gypsum anhydride. These gypsum compounds are not restricted to natural gypsum, but may be an industrial product. When the gypsum compound is used as the reaction moderator, the amount of gypsum compound in the resultant demolition-facilitating clinker composition is 40% or less, preferably, in the range of from 5% to 40%, in terms of gypsum anhydride, based on the total weight of gypsum and the clinker.

The reason for limiting the gypsum compound to the above percentage range is as follows.

When the amount of gypsum compound is less than 5%, in terms of gypsum anhydride, the hydration reaction of the resultant demolition-facilitating substance is, sometimes carried out too fast, so the handling time is insufficient. Also, when the amount of the gypsum compound is more than 40.0%, in terms of gypsum anhydride, the resultant demolition-facilitating clinker composition inevitably exhibits an unsatisfactory demolishing force in an actual demolition process.

The sugars usable as the reaction moderator may include sucrose, glucose, fruit sugar, and blackstrap molasses. Also, the polyhydric alcohols usable as the reaction moderator, may include sorbitol, mannitol, and xylitol. A liquid polyhydric alcohol, such as glycerine, can also be used. When liquid polyhydric alcohol is used, it is necessary that the alcohol be first dissolved in water and the solution then mixed with the clinker.

The reaction-moderating effect of the sugars or polyhydric alcohols added to the clinker is due to the forming of a layer of a slightly water-soluble calcium complex with sugars or the polyhydric alcohol on the surface of the active lime particles. This layer is effective for temporarily delaying the hydration reaction of the active lime. The amount of sugars or polyhydric alcohols to be added to the clinker is 5% or less, preferably, in the range of from 0.1 to 5%, based on the total weight of the resultant demolition-facilitating clinker composition.

When the amount of the reaction moderator consisting of sugars and/or polyhydric alcohols is less than 0.1%, the hydration reaction-moderating effect may not always be satisfactory. Also, if the amount of reaction moderator is more than 5%, it is not effective in increasing the reaction moderating effect thereof.

The demolition-facilitating clinker composition comprising the above-mentioned clinker, the gypsum compound, and sugars and/or polyhydric alcohols has an advantage in that the handling time can be optionally controlled, as compared with other demolition facilitating substances composed of the clinker alone. Therefore, the demolition-facilitating clinker composition comprising the above-mentioned clinker, gypsum, and sugars and/or polyhydric alcohols can be very easily used at a variety of worksites. Also, this type of demolition-facilitating clinker composition is superior to other demolition-facilitating substances consisting of the above-mentioned clinker alone, in that the handling time can be sufficiently controlled.

When a borate was used as a reaction moderator, it was found that the borate exhibited a retarding effect on the hydration reaction. Borates usable as the reaction moderator may include borates of alkali metals and alkaline earth metals, for example, sodium borates (deca hydrate, penta hydrate, anhydride), potassium borate, ammonium borate, calcium borate, and the like. The amount of borate to be added to the clinker is in the range of from 0.1 to 20% based on the entire weight of the resultant demolition-facilitating substrate. When the amount of borate is less then 0.1%, the retarding effect on the hydration reaction, sometimes, may be unsatisfactory. If the amount of borate is more than 20%, the resultant aqueous slurry of the demolition-facilitating clinker composition exhibits a remarkably decreased fluidity. In order to prepare a slurry having a satisfactory fluidity, it is necessary that the slurry contain a large amount of water. However, a large amount of water causes the resultant slurry to exhibit a poor demolishing force.

The reaction moderator usable for the present invention may consist of at least one borate and at least one member selected from a group consisting of sugars, polyhydric alcohols, organic acids, and organic acid salts. The organic acids may include ditric acid, benzoic acid, gluconic acid, oxalic acid, maleic acid, succinic acid, and tartaric acid and the organic acid salts may include sodium citrate, potassium citrate, sodium benzoate, calcium benzoate, sodium oxalate, potassium oxalate, ammonium oxalate, sodium tartarate, and potassium tartarate.

The sum of the weight of borate and at least one member selected from the group consisting of organic acids and/or organic acid salts in the resultant demolition-facilitating clinker composition is 20% or less, preferably, in the range of from 0.1 to 20% based on the total weight of the resultant demolition-facilitating substance.

By using this type of reaction moderator, an excellent hydration-retarding effect can be obtained due to the synergistic action of an inorganic component consisting of borate and an organic component consisting of sugars, polyhydric alcohols, organic acids and/or organic acid salts. The addition of an organic component to the borate effectively increases the fluidity of the aqueous slurry of the resultant demolition-facilitating clinker composition. This feature is effective for decreasing the amount of water contained in the slurry, and for increasing the demolishing force of the slurry. Owing to the above-mentioned advantages, the demolition-facilitating clinker composition containing borate or a borate mixture as the reaction moderator is suitable for filling a large hole having a diameter of more than about 50 mm, because an undesirable effusion of the demolition-facilitating substance from the hole can be prevented by the borate-containing reaction moderator.

The present invention will be understood more readily with reference to the following examples. However, these examples are intended to illustrate the invention and are not to be construed as limiting the basic conception of the present invention.

In the examples, various types of clinkers were produced from raw materials having the chemical compositions shown in Table 1.

TABLE 1

| Material | Chemical Composition (wt %) | | | | | | |
|---|---|---|---|---|---|---|---|
| | Ignition loss | SiO$_2$ | Al$_2$O$_3$ | Fe$_2$O$_3$ | CaO | MgO | Total |
| Limestone | 43.4 | 0.3 | 0.1 | 0.1 | 55.5 | 0.6 | 100 |
| Dolomite | 45.8 | 0.2 | 0.1 | 0.1 | 35.1 | 18.2 | 99.5 |
| Hammer scale | — | — | — | 100 | — | — | 100 |
| Bauxite | 31.2 | 2.8 | 62.4 | 2.5 | 0.1 | 0.1 | 99.1 |

In the resultant clinkers, the amounts of impurities including C$_3$S, C$_2$S, and C$_3$A were determined in accordance with Japanese Industrial Standard (JIS) R 5202.

EXAMPLES 1 THROUGH 6 AND COMPARATIVE EXAMPLES 1 THROUGH 4

In each of the Examples 1 through 6 and Comparative Examples 1 through 4, a demolition-facilitating substance was prepared and its expanding property and workability were tested. A clinker of the demolition-facilitating substance was prepared in the following manner. Limestone, dolomite, hammer scale and bauxite were ground separately, and the resultant powders were mixed in a predetermined mixing ratio to prepare a raw material, having a composition as indicated in Table 1. The raw materials were molded into pellets, and the pellets were sintered, at a temperature indicated in Table 1, by using an electric furnace, to prepare a clinker. The clinker was ground by using a ball mill to prepare a clinker powder having a distribution of grain size as shown in Table 2. The powder was used as a demolition-facilitating material. The demolition-facilitating material was mixed with water, and the workability and percentage of linear expansion of the resultant aqueous slurry was measured. The results of these measurements are indicated in Table 3.

As can be seen from Table 3, the demolition-facilitating materials according to the present invention exhibited a long enough handling time, excellent workability, and a satisfactory linear expansion coefficient thereof, and, therefore, were very useful as practical demolition-facilitating substances.

Moreover, comparative demolition-facilitating substances, which fell outside the scope of the present invention, exhibited a very short handling time, poor workability and/or an unsatisfactory linear expansion coefficient. Therefore, they were useless as practical demolition-facilitating substances.

TABLE 2

| Example No. | Calcinating temperature | Composition (%) C₄AF | F CaO | F MgO | C₃S | C₂S | C₃A | Distribution of grain size (%) 250 ~ 149μ | 149 ~ 88μ | 88 ~ 44μ | 44μ> |
| --- | --- | --- | --- | --- | --- | --- | --- | --- | --- | --- | --- |
| Example 1 | 1600 | 10 | 80 | 4 | 5 | 0 | 0 | 12.6 | 17.7 | 18.6 | 51.1 |
| Example 2 | 1600 | 10 | 80 | 4 | 5 | 0 | 0 | 26.0 | 34.4 | 39.3 | 0.0 |
| Example 3 | 1250 | 8 | 55 | 31 | 0 | 2 | 0 | 20.4 | 28.7 | 23.7 | 25.5 |
| Example 4 | 1500 | 2 | 94 | 1 | 2 | 0 | 0 | 13.1 | 18.2 | 19.5 | 49.2 |
| Example 5 | 1350 | 23 | 68 | 5 | 1 | 2 | 0 | 12.7 | 18.0 | 19.0 | 50.3 |
| Example 6 | 1300 | 38 | 59 | 2 | 0 | 0 | 0 | 12.5 | 17.9 | 18.8 | 50.8 |
| Comparative Example 1 | 1150 | 2 | 94 | 1 | 0 | 2 | — | 13.2 | 18.5 | 19.8 | 48.5 |
| Comparative Example 2 | 1500 | 0 | 99 | 1 | 0 | 0 | — | 14.0 | 19.5 | 20.2 | 46.3 |
| Comparative Example 3 | 1300 | 45 | 50 | 2 | 0 | 2 | — | 13.0 | 18.3 | 19.5 | 49.2 |
| Comparative Example 4 | 1600 | 10 | 80 | 0.8 | 5 | 2 | 0 | 13.0 | 18.0 | 20.0 | 49.0 |

TABLE 3

| Example No. | Water/calcinated article | Handling time (1) | Workability | Linear expansion (Δℓ/lo × 100) 24 hrs after | 48 hrs after |
| --- | --- | --- | --- | --- | --- |
| Example 1 | 0.3 | 1.5 min. | Good(2) | 20 | 50 |
| Example 2 | 0.3 | 2 hrs. | " | 5 | 70 |
| Example 3 | 0.3 | 5 hrs. | " | 1 | 20 |
| Example 4 | 0.3 | 10 min. | " | 35 | 72 |
| Example 5 | 0.3 | 35 min. | " | 8 | 30 |
| Example 6 | 0.3 | 40 min. | " | 7 | 25 |
| Comparative Example 1 | 0.3 | 1 min. | Poor | — | — |
| Comparative Example 2 | 0.3 | 1 min. | " | — | — |
| Comparative Example 3 | 0.3 | 1 hr. | Good | 1 | 10 |
| Comparative Example 4 | 0.3 | 1 min. | Poor | — | — |

Note:
(1)Handling time is expressed as the time elapsed from the start of the mixing operation of the demolition-facilitating substance with water to the start of the generation of heat in the mixture.
(2)The judgement of "good" means that the aqueous slurry exhibited a good enough fluidity for pouring.
(3)The judgement of "poor" means that the aqueous slurry did not exhibit a good enough fluidity for pouring.

EXAMPLES 7 THROUGH 11

In each of the Examples 7 through 11, the same clinker as that described in Example 1 was mixed with the additive indicated in Table 4 to provide a reaction moderator-containing demolition-facilitating clinker composition having the composition indicated in Table 4.

The resultant demolition-facilitating clinker composition exhibited the properties indicated in Table 4.

TABLE 4

| Example No. | Clinker Type | Amount (Part by weight) | Reaction Moderator Type | Amount (Part by weight) (*) | Handling time (min) | Workability | Linear expansion (%) 6 h. after | 12 h. after | 48 h. after |
| --- | --- | --- | --- | --- | --- | --- | --- | --- | --- |
| Example 7 | The same as that of Example 1 | 70 | Gypsum anhydride | 30 | 30 | Good | 5 | 15 | 50 |
| 8 | The same as that of Example 1 | 80 | Gypsum anhydride | 20 | 15 | " | 30 | 35 | 50 |
| 9 | The same as that of Example 1 | 90 | Gypsum anhydride | 10 | 10 | " | 30 | 35 | 50 |
| 10 | The same as that of Example 1 | 70 | Gypsum semihydrate | 30 | 35 | " | 10 | 20 | 55 |
| 11 | The same as that of Example 1 | 70 | Gypsum dihydrate | 30 | 28 | " | 10 | 15 | 50 |

Note (*) - The amount is in terms of gypsum anhydride.

From Table 4, it is clear that each of the demolition-facilitating clinker compositions, which include gypsum semihydrate, gypsum dihydrate, or gypsum anhydride as a reaction moderator, exhibits a satisfactory handling time, a good workability, and an excellent expansion property. Also, it is clear that the handling time can be prolonged with an increase in the content of the gypsum compound in the demolition-facilitating clinker composition.

EXAMPLES 12 THROUGH 20

In each of the Examples 12 through 17, a clinker A, which was the same as that described in Example 1, was mixed with the additive indicated in Table 5 to provide a reaction moderator-containing demolition-facilitating clinker composition having the composition indicated in Table 5.

The resultant demolition-facilitating clinker composition exhibited the properties indicated in Table 5.

In Examples 18, 19, and 20, clinker B, clinker C, or clinker D, which are the same as those described in Examples 2, 3, or 4, respectively, was mixed with the additive indicated in Table 5 to provide a reaction moderator-containing demolition-facilitating clinker composition having the composition indicated in Table 5.

The resultant demolition-facilitating clinker composition exhibits properties as indicated in Table 5.

Table 5 clearly shows that the addition of a very small amount of sucrose or sorbitol to a clinker is effective for prolonging the handling time. Also, the addition of glycerol is effective for enhancing the expansion property of the demolition-facilitating clinker composition.

EXAMPLES 21 THROUGH 23

In each of the Examples 12 through 23, a clinker A, which was the same as that described in Example 1, was mixed with the additive indicated in Table 6 to provide a reaction moderator-containing demolition-facilitating clinker composition having the composition indicated in Table 6.

The resultant demolition-facilitating clinker composition exhibited the properties indicated in Table 6.

From Tables 4 and 6, it is clear that the addition of the sucrose to the mixture of the clinker and the gypsum effectively prolongs the handling time.

TABLE 6

| Example No. | Clinker Type | Amount (part by weight) | Type | Amount (part by weight) | Reaction Moderator Type | Amount (part by weight) | Handling time | Linear expansion (%) 12 h. after | 24 h. after |
|---|---|---|---|---|---|---|---|---|---|
| Example 21 | Clinker A$^{(1)}$ | 70 | Gypsum anhydride | 30 | Sucrose | 0.4 | 1 hr. | 20 | 25 |
| 22 | Clinker A$^{(1)}$ | 80 | Gypsum anhydride | 20 | " | 0.4 | 40 min. | 30 | 40 |
| 23 | Clinker A$^{(1)}$ | 90 | Gypsum anhydride | 10 | " | 0.4 | 35 min. | 30 | 40 |

$^{(1)}$Clinker A has the same composition as that of Example 1.

EXAMPLES 24 THROUGH 28

In each of the Examples 24 through 28, the same clinker as that described in Example 1 was mixed with a reaction moderator having the composition indicated in Table 7 to provide a reaction moderator-containing demolition-facilitating clinker composition having the composition indicated in Table 7.

The resultant demolition-facilitating clinker composition exhibited the properties indicated in Table 7.

From Table 7, it is clear that the borates were very effective for prolonging the handling time of the demolition-facilitating substance. Accordingly, the demolition-facilitating clinker compositions containing the borate are suitable for demolishing a large scale structure of rigid materials in hot weather.

The demolishing process according to the present invention for rock, concrete, or firm ground will be illustrated by the following examples.

TABLE 5

| Example No. | Clinker Type | Amount (Part by weight) | Reaction Moderator Type | Amount (Part by weight) | Handling time | Workability | Linear expansion (%) 12 h. after | 48 h. after |
|---|---|---|---|---|---|---|---|---|
| Example 12 | A$^{(1)}$ | 100 | Sucrose | 0.0 | 15 min | Good | 15 | 20 |
| 13 | " | 100 | " | 0.4 | 30 min. | " | 20 | 25 |
| 14 | " | 100 | " | 0.8 | 20 min. | " | 15 | 20 |
| 15 | " | 100 | Sorbitol | 0.1 | 30 min. | " | 15 | 20 |
| 16 | " | 100 | " | 0.4 | 40 min. | " | 15 | 20 |
| 17 | " | 100 | " | 0.8 | 20 min. | " | 15 | 20 |
| 18 | B$^{(2)}$ | 100 | Sucrose | 0.4 | 3 hrs. | " | 5 | 30 |
| 19 | C$^{(3)}$ | 100 | " | 0.4 | 7 hrs. | " | 5 | 20 |
| 20 | D$^{(4)}$ | 100 | Glycerol | 4 | 30 min. | " | 20 | 35 |

Note:
$^{(1)}$Clinker A has the same composition as that of Example 1.
$^{(2)}$Clinker B has the same composition as that of Example 2.
$^{(3)}$Clinker C has the same composition as that of Example 3.
$^{(4)}$Clinker D has the same composition as that of Example 4.

TABLE 7

| Example No. | Clinker Type | Amount (part by weight) | Reaction Moderator Type of component | Amount (part by weight) | Handling time (min.) | Amount of water (part by weight) | Linear expansion (%) 12h.after | 48h.after |
| --- | --- | --- | --- | --- | --- | --- | --- | --- |
| 24 | The same as that of Example 1 | 100 | Sodium borate decahydrate | 4 | 120 | 33 | 15 | 37 |
| 25 | The same as that of Example 1 | " | Sodium borate pentahydrate | 3 | 150 | 31 | 14 | 35 |
| 26 | The same as that of Example 1 | " | Potassium borate dehydrate | 4 | 120 | 33 | 15 | 38 |
| 27 | The same as that of Example 1 | " | sodium borate decahydrate / surrose | 4 / 0.3 | 180 | 28 | 13 | 45 |
| 28 | The same as that of Example 1 | " | sodium borate decahydrate / sodium gluconic acid / gypsum anhydride | 4 / 0.3 / 5 | 210 | 28 | 12 | 42 |

EXAMPLE 29

A small hole, 2 cm in diameter and 20 cm in depth, was drilled in the center position of a piece of limestone having an upper surface area about 50 cm square. 100 parts by weight of a demolition-facilitating clinker powder, which was the same as that described in Example 5, was added to 1.0 part by weight of sorbitol and 30 parts by weight of water. The mixture was stirred for two minutes to prepare a slurry. The above-mentioned hole in the limestone was filled with the slurry and said slurry was left to harden. After three hours, the slurry had hardened, and after twenty-four hours, the limestone was completely demolished.

EXAMPLE 30

A small hole, 2 cm in diameter and 20 cm in depth, was drilled in the center portion of a column made of concrete, which was 20 cm in diameter and 40 cm in length. 70 parts by weight of the same demolition-facilitating clinker powder as that described in Example 1 was mixed with 30 parts by weight of gypsum anhydride, 0.4 parts by weight of sucrose, and 30 parts by weight of water. The mixture was stirred for two minutes to prepare a slurry. The above-mentioned hole in the column was filled with the slurry, and the slurry was allowed to harden. After one hour, the slurry had hardened and, after six hours, the column cracked in all directions and, thereafter, was completely demolished.

The tenacity of the column was estimated to be 500 ~600 kg/cm.

EXAMPLE 31

In a hard shale mine, an exposed rock floor, having a horizontal upper surface and a vertical side surface, was demolished in the following manner.

In the upper surface of the rock floor, 11 holes were drilled, each having a vertical depth of 1.7 m and a diameter of 0.6 m and located at intervals of 1 m from each other along a line spaced 1 m from the vertical side surface and parallel to the vertical side surface. Another 11 holes, having the same size as those mentioned above, were drilled in the upper surface along a line spaced 2 m from the vertical side surface and parallel to the vertical side surface. The holes were formed at 1 m intervals from each other.

A demolition-facilitating substance consisting of 70 parts by weight of a clinker, which was the same as that described in Example 1, 30 parts by weight of gypsum anhydride, and 0.4 part by weight of sucrose, was mixed with 30 parts by weight of water, and the mixture was stirred for 10 minutes to prepare a slurry.

The holes were then filled with the slurry. The slurry started solidifying one hour after the filling operation. Five hours after the filling operation, many cracks were formed around the holes, and 12 hours after the filling operation, the rock floor was demolished to an extent that it could be torn apart by a bulldozer.

EXAMPLE 32

Granite in the ground was demolished in the following manner.

At the upper surface of the ground, 105 holes, each having a depth of 3 m and a diameter of 68 mm, were drilled at an angle of 65 degrees from the upper surface along five lines spaced 1 m from and parallel to each other. On each line, the holes were located at 1 m intervals from each other.

In order to prepare a slurry, 96.7 parts by weights of the same clinker as that described in Example 1 was uniformly mixed with 3 parts by weight of sodium borate decahydrate and 0.3 parts by weight of sucrose, and the mixture was suspended in 30 parts by weight of water. The suspension was stirred for 2 minutes.

The holes were filled with the slurry. One hour after the filling operation, the slurry started solidfying. Five hours after the filling operation, many cracks, having a length of from 0.5 to 1 mm, were formed around the holes. 24 hours after the filling operation, the ground was demolished to an extent that the ground could be torn up by a bulldozer. During the demolishing operation, no slurry was ejected from the holes.

We claim:

1. A method for demolishing a durable hard structrue, comprising:
   forming one or more holes in a durable hard structure;
   filling the holes with an aqueous slurry containing a demolition-facilitating clinker composition consisting essentially of (1) 55% to 99.9% by weight of a clinker consisting essentially of 2 to 40% by weight of a calcium-alumino-ferrite solid solution, 60 to 98% by weight of both free lime and free magnesia in the ratio in weight of the free lime to the free magnesia of from 60:40 to 98.3:1.7, and not more than 6% by weight of an inevitable impurity free from $(CaO)_3Al_2O_3$ determined in accordance with Japanese Industrial Standard (JIS) R 5202, said clinker being produced, with the clinker components sintered together, at a sintering temperature of from 1200° C. to 1800° C., and (2) 0.1% to 45% by weight of a reaction moderator consisting of at least one member selected from the group consisting of (a) at least one gypsum compound selected from the group consisting of gypsum dihydrate, gypsum hemihydrate and gypsum anhydrate, said gypsum compound, in terms of gypsum anhydride, being present in said composition in an amount of 5% to 40% (b) at least one polyhydroxyl substance selected from the group consisting of sugars and polyhydric aliphatic alcohols, said polyhydroxyl substance being present in said composition in an amount of 0.1% to 5%, and (c) at least one member selected from borates of alkali metals and alkaline earth metals and mixtures of at least one of the above-mentioned borates with at least one member selected from the group consisting of organic acids and organic acids salts, said borate or mixture thereof with an organic acid or organic acid salt being present in said composition in an amount of 0.1% to 20%, each amount being based on the total weight of said demolition-facilitating clinker composition; and leaving said clinker composition in the aqueous slurry to demolish the durable structure by the expansion force generated from a hydration reaction of said clinker composition.

2. The method as claimed in claim 1, wherein said polyhydroxyl substance is selected from the group consisting of sucrose, glucose, fruit sugar, blackstrap molasses, sorbitol, mannitol, xylitol, and glycerine.

3. The method as claimed in claim 1, wherein said borate is selected from the group consisting of sodium borate, potassium borates, ammonium borate, and calcium borates.

4. The method as claimed in claim 1, wherein said reaction moderator consists of, in terms of gypsum anhydride, 5% to 40% of said at least one gypsum compound, and said polyhydroxyl substance in an amount of from 0.1% to 5%, based on the total weight of said demolition-facilitating clinker composition.

5. The method as claimed in claim 1, wherein said reaction moderator consists of a mixture consisting of at least one borate and at least one member selected from the group consisting of sugars, polyhydric alcohols, organic acids, and organic acid salts, the amount of said mixture in said composition being in the range of from 0.1% to 20%, based on the total amount of said demolition-facilitating clinker composition.

6. The method as claimed in claim 1, wherein said aqueous slurry is prepared within said holes by filling the holes with the clinker composition in the form of a fine powder and by adding water to the clinker composition.

7. The method as claimed in claim 1, wherein said aqueous slurry is preliminarily prepared outside of the holes and then inserted into the holes.

8. The method as claimed in claim 1, wherein said aqueous slurry is preliminarily prepared outside of the holes, and placed into the tube made of a plastic material and then the tube is inserted into the holes.

9. A method for demolishing a durable hard structure, comprising:

forming one or more holes in a durable hard structure;

filling the holes with an aqueous slurry containing a demolition-facilitating clinker consisting essentially of 2 to 40% by weight of a calcium-aluminoferrite solid solution, 60 to 98% by weight of both free lime and free magnesia in the ratio in weight of the free lime to the free magnesia of from 60:40 to 98.3:1.7, and not more than 6% by weight of an inevitable impurity free from $(CaO)_3Al_2O_3$ determined in accordance with Japanese Industrial Standard (JIS) R 5202, said clinker being produced, with the clinker components sintered together, at a sintering temperature of from 1200° C. to 1800° C.; and leaving said clinker in the aqueous slurry to demolish the durable structure by the expansion force generated from a hydration reaction of said clinker.

10. The method as claimed in claim 9, wherein said aqueous slurry is prepared within said holes by filling the holes with the clinker in the form of a fine powder and by adding water to the clinker powder.

11. The method as claimed in claim 9, wherein said aqueous slurry is preliminarily prepared outside of the holes and then inserted into the holes.

12. The method as claimed in claim 9, wherein said aqueous slurry is preliminarily prepared outside of the holes, and placed into a tube made of a plastic material and then the tube is inserted into the holes.

* * * * *